United States Patent [19]

Moser et al.

[11] Patent Number: 4,749,070
[45] Date of Patent: Jun. 7, 1988

[54] HYDRAULIC VIBRATION DAMPER HAVING ADJUSTABLE DAMPING VALVE

[75] Inventors: Bernd Moser, HammSieg; Heinz Knecht, Eitorf, both of Fed. Rep. of Germany

[73] Assignee: Boge GmbH, Eitorf, Fed. Rep. of Germany

[21] Appl. No.: 15,522

[22] Filed: Feb. 13, 1987

Related U.S. Application Data

[63] Continuation of Ser. No. 772,316, Sep. 4, 1985, abandoned, which is a continuation-in-part of Ser. No. 766,871, Aug. 16, 1985, Pat. No. 4,638,670, which is a continuation-in-part of Ser. No. 653,930, Sep. 24, 1984, Pat. No. 4,587,850, which is a continuation-in-part of Ser. No. 621,075, Jun. 15, 1984, Pat. No. 4,577,509, and Ser. No. 700,451, Feb. 11, 1985, abandoned.

[30] Foreign Application Priority Data

Sep. 4, 1984 [DE] Fed. Rep. of Germany ....... 3432465

[51] Int. Cl.$^4$ .......................... F16F 9/46; F16K 31/02
[52] U.S. Cl. ................................... 188/299; 188/315; 251/129.08
[58] Field of Search ....................... 188/1.11, 299, 285, 188/300, 309, 310, 319, 322.17, 313, 314, 315; 280/707, 714, 6.1; 137/599; 251/129.08, 129.15

[56] References Cited

U.S. PATENT DOCUMENTS

| | | | |
|---|---|---|---|
| 2,061,068 | 11/1936 | Fuchs | 188/299 |
| 3,827,538 | 8/1974 | Morgan | 188/299 X |
| 4,305,486 | 12/1981 | Cowan | 188/299 X |
| 4,345,737 | 8/1982 | Kawai et al. | 251/129.08 X |
| 4,465,299 | 8/1984 | Stone et al. | 188/299 X |

FOREIGN PATENT DOCUMENTS

| | | |
|---|---|---|
| 2911768 | 1/1983 | Fed. Rep. of Germany . |
| 3241984 | 6/1983 | Fed. Rep. of Germany . |
| 3231739 | 3/1984 | Fed. Rep. of Germany . |
| 3312881 | 11/1984 | Fed. Rep. of Germany ..... 188/1.11 |
| 1095506 | 6/1955 | France . |
| 520317 | 3/1955 | Italy ................................... 188/315 |
| 560563 | 12/1955 | Italy ................................... 188/299 |
| 211042 | 12/1983 | Japan .................................. 188/299 |
| 1363303 | 8/1974 | United Kingdom ........... 188/322.14 |
| 2125930 | 3/1984 | United Kingdom ................ 188/299 |

Primary Examiner—Andres Kashnikow
Assistant Examiner—Robert J. Oberleitner
Attorney, Agent, or Firm—Nils H. Ljungman

[57] ABSTRACT

An adjustable damping valve for use on a hydraulic vibration damper, gas pressure damper or hydropneumatic suspension, which regulates the damping force, regardless of the orientation, and is variable in the regulation of the throughput, thereby providing a rapid switching frequency response. The damping valve has at least one electromagnet. In the preferred embodiment, each electromagnet can be controlled individually. Further, each electromagnet has a coil body with a winding and an armature. The armature is immersed in a fluid in the flow connection during operation. The armatures of the electromagnets interrupt and open directly the flow connection variably and quickly between an upper damping chamber of the vibration damper and a pressure equalization chamber. In one embodiment, there are a number of individual flow connections with corresponding electromagnets distributed over the circumference for fast action.

20 Claims, 22 Drawing Sheets

HYDRAULIC VIBRATION DAMPER HAVING ADJUSTABLE DAMPING VALVE

CROSS REFERENCE TO CO-PENDING APPLICATIONS

This application is a continuation of U.S. application Ser. No. 772,316, filed on Sept. 4, 1985, and now abandoned, which is a continuation-in-part of co-pending application Ser. No. 766,871, for filing be Bernd Moser on Aug. 16, 1985, entitled "Apparatus For The Determination Of The Distance Traveled By A Piston In A Cylinder" now U.S. Pat. No. 4,638,670, which application is a continuation-in-part of co-pending application Ser. No. 653,930 filed by Bernd Moser on Sept. 24, 1984, entitled "Arrangement For Determining The Travel Of A Piston", now U.S. Pat. No. 4,587,850, which application is a continuation-in-part of co-pending application Ser. No. 621,075, filed by Bernd Moser on June 15, 1984, also entitled "Arrangement For Determining The Travel Of A Piston", now U.S. Pat. No. 4,577,509, and further co-pending application Ser. No. 700,451, filed by Heinz Knecht, et al. on Feb. 11, 1985, entitled "Vibration Damper Apparatus" now abandon, all of the above-cited co-pending applications being assigned to the same assignee as the instant application

BACKGROUND OF THE INVENTION

1. Field of the Invention

The invention relates to a hydraulic vibration damper, and more particularly, to a hydraulic vibration damper with an adjustable damping valve.

2. Description of the Prior Art

The prior art includes vibration dampers such as those in German Laid-Open Patent Application No. DEOS 29 11 768, in which control is exercised by means of electromagnets and also by means of which the damping force can be adjusted at a low piston velocity. A disadvantage is that no change of the damping forces is possible at medium and high piston velocities. Since the piston rod in this arrangement can only open or close a corresponding bypass, no valve force changes at medium piston velocity are possible. Therefore, this arrangement is designed as a bypass valve, and can only be used in connection with a conventional damping force regulation.

Vibration dampers or shock absorbing legs are also known, such as in German Laid Open Patent Application No. DE-OS 32 31 739, in which the damping force can be changed. However, with this apparatus, there is an active bypass valve with a controllable cross-section modification parallel to the damping valves. This bypass valve system is intended for easy installation in the available space of a vibration damper.

OBJECTS OF THE INVENTION

An object of the invention is the creation of a damping valve for a hydraulic vibration damper, in which the desired throughput can be modified gradually as desired.

It is a further object of the invention to provide control of the flow, whereby the damping force can be achieved.

It is another object of the invention to provide a vibration damper that can have its operation controlled by an electronic control system.

SUMMARY OF THE INVENTION

To achieve these objectives, the invention proposes that the damping valve comprises at least one electromagnet, whereby each electromagnet can be controlled individually. The electromagnets would also exhibit a coil body with a winding and an armature, which influences the cross section of the flow connection.

An advantage of this embodiment is that a simple, reliable control is possible, in that the armature of the electromagnet directly regulates the flow quantity and, therefore, the damping force. Another advantage is that the armature is immersed in the flow connection. Thus, the armature of the electromagnet can directly close off the flow connection, either completely or partly, so that it is possible to have a continuously flowing residual amount of damping medium. A further advantage is that the piston, customarily used to regulate the damping force, can be designed comparatively simply, since the damping force regulation takes place exclusively by means of the damping valve located in the flow connection.

A particularly economical and simple embodiment of the invention is one in which the damping valve is located in a guide component, which is responsible for guiding the piston rod. Such an embodiment can, in addition to the damping valve, simultaneously provide the corresponding flow connections and also guidance for the piston rod. The necessary corresponding electrical connections can be provided with particular ease at this point.

Another essential characteristic is that the armatures are oriented transverse to the center axis of the flow connection and co-axial to the center axis of the work cylinder. This configuration is advantageous in that such damping valve can be operated independently of the direction of flow. As a result of the placement of the armature in the flow connection, a corresponding influence is exerted on the flow resistance. Depending upon the piston velocity, there is also a corresponding damping force.

In one embodiment of the invention, the armature is oriented transverse to the center axis of the work cylinder. This arrangement allows for a connection of the damping valve to the external tube. Thus, an independent direction of flow of the damping medium can be maintained as a result of the orientation of the armature transverse to the flow connection.

A particularly favorable embodiment of the invention provides that the flow connection be designed as an annular channel, whereby there are corresponding connection chambers from the upper work chamber to the annular chamber, and from the equalization chamber to the annular chamber. The damping medium is thereby conducted through the damping valve into the annular channel so that armatures distributed over the entire circumference can exert an influence on the flow resistance. In such a configuration, several electromagnets can easily be provided. Therefore, a broad range of flow, fast-action, and simple and reliable control are achieved by means of parallel control and a large number of armatures. As a result of the parallel control of each individual electromagnet, a rapid switching frequency can be achieved. To achieve a further variability of the throughput of the damping medium, a preferred embodiment proposes that the flow connection comprises several connection channels connected with the upper work chamber and the equalization chamber, whereby there is at least one armature of an electromagnet immersed in each connection channel.

One advantage of this embodiment is that there can be any number of individual channels, which can be controlled independently of one another, in the flow connection from the upper work chamber into the equalization chamber. Thereby, each individual connection channel is activated by an electromagnet equipped with an armature. A flow regulation is achieved by the immersion of the armature in the connection channel. As a result of the parallel control, each connection channel can be controlled individually, or all of the flow channels can be controlled together, to influence the flow resistance. It does not matter whether the individual connection channels exhibit the same cross section, or whether each individual connection channel has a different cross section. Depending on the embodiment, the armature is adapted to the cross section of the flow channel.

When several electromagnets are used, even greater variability is achieved if the diameters of the armatures are of different sizes or if several armatures are immersed in a single flow connection. In the latter case, the diameters of the armatures can be the same or different.

Such an adjustable damping valve offers a variety of possibilities with regard to the regulation of damping force. To take full advantage of the possibilities offered, a suitable electronic control system and/or a corresponding sensor can be used to record the desired parameters.

Moreover, according to the invention, the portion of the flow connection emptying into the upper work chamber is designed as a throttle. Such a design, together with the damping valve, makes possible a two-stage regulation of the damping force. The configuration of the damping valve can thereby be designed so that it is possible to shut off the damping connection, either completely or only partly.

The armatures of each individual electromagnet contain a return system, which can be designed as a return spring, a permanent magnet or a coil. The return system can also be designed to exert a return force by means of the internal system pressure.

The damping valve can be used as is in gas pressure dampers, two-tube dampers with and without system pressure, and hydropneumatic suspension elements.

BRIEF DESCRIPTION OF THE DRAWINGS

Preferred embodiments of the invention are diagrammatically and schematically illustrated in the accompanying drawings, wherein.

DESCRIPTION OF THE PREFERRED EMBODIMENTS

Figure 1:
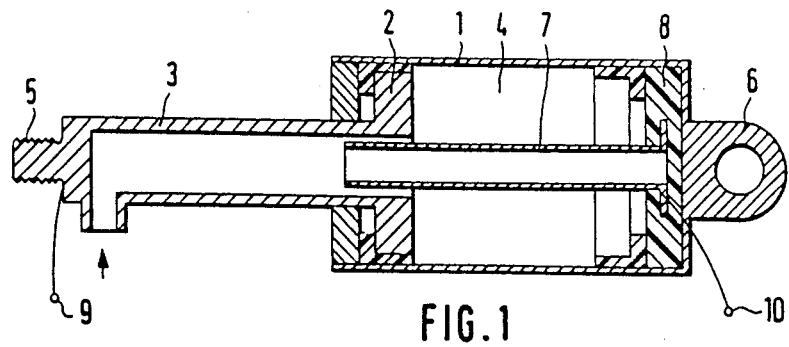
FIG. 1 shows a sectional view of a vibration damper, in which the hollow piston rod forms a variable capacitor in conjunction with a tube in a cavity of the damper.

The vibration damper illustrated in FIG. 1 comprises substantially a cylinder 1, a piston 2 and a piston rod 3, well known in the prior art. In the interior cavity 4 of the cylinder 1 there is at least one damping medium serving for damping vibrations of the piston 2. Attachment means 5 and 6, well-known in the prior art, are provided for mounting the vibration damper in a vehicle. The piston rod 3, which is made hollow, slides telescopically over a tube 7, the tube 7 being located in the cylinder 1, and attached thereto by an insulating body 8 which insulates the tube 7 from the remainder of the components of the damper. The hollow piston rod 3 and the tube 7 form together a variable circular cylindrical capacitor. The damping medium present in the interior cavity 4 forms a dielectric for the capacitor. The hollow piston rod 3 forms the first electrode and is connected through a lead 9 connected through an insulating terminal (not shown) to appropriate terminals of an appropriate measurement device. The tube rod 7 forms a second electrode which is connected through a lead 10 to appropriate terminals of the measurement device.

Figure 2:
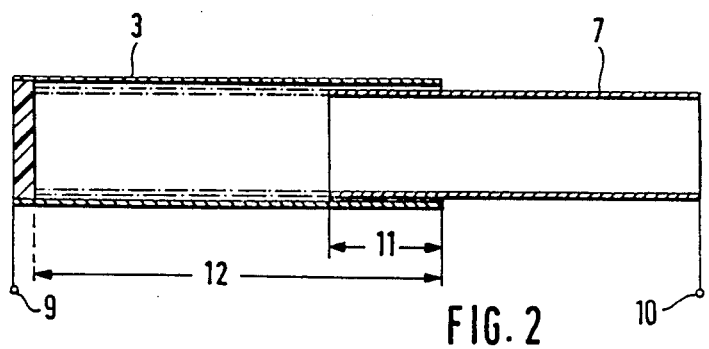
FIG. 2 shows a sectional view of a diagrammatic representation of a cylindrical capacitor.
Figure 8:
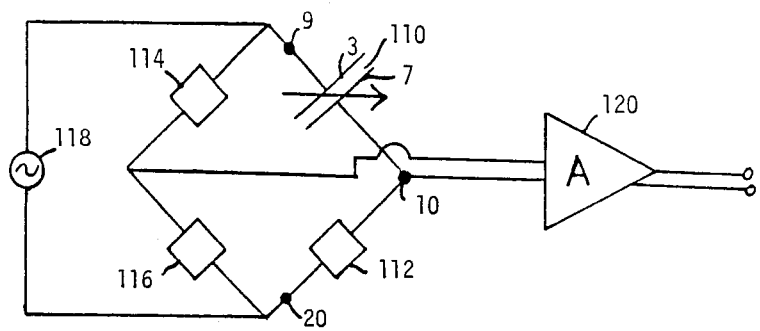
FIG. 8 shows schematically the embodiments of FIG. 1 and FIG. 7 arranged in an impedance measuring bridge.

The steepness of the change in capacitance is dependent upon the spacing between the outer surface of the tube 7 and the inner surface of the hollow piston rod 3, and on the medium present between them. The hollow piston rod 3 is arranged coaxially with and is concentrically spaced from the tube 7; a space between them receives the dielectric which may be a damping medium such as oil, or even a dielectric solid between the facing surfaces of the tube 7 and the piston rod 3. In FIG. 2, there is diagrammatically illustrated a cylindrical capacitor, the first electrode thereof comprising the hollow piston rod 3 and the second electrode comprising tube 7. The spacing 11 indicates a practical minimum overlap. The spacing 12 indicates the maximum overlap between the two surfaces when the piston 2 is as far to the right in FIG. 1 as it can move. These overlaps produce a minimum and maximum capacitance when appropriately converted, and represent the minimum and maximum travel positions of the piston. By interpolating between these extremes, the position of the piston in the cylinder is indicated by a capacitance thereinbetween. The leads 9 and 10 serve, for example, for connection to a capacitance measuring bridge as shown in FIG. 8 infra.

Figure 3:
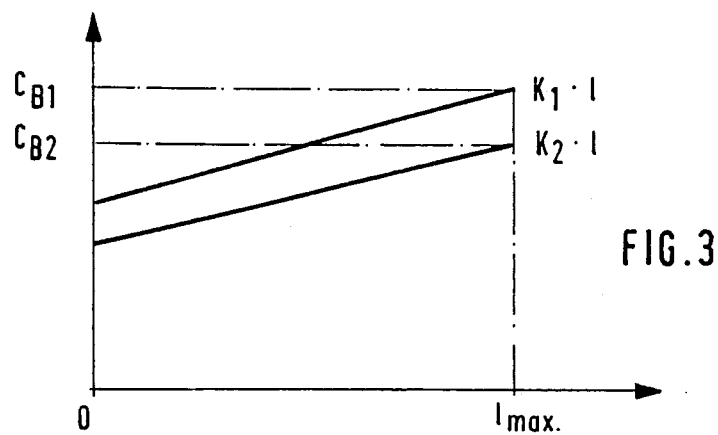
FIG. 3 shows a diagram of capacitance of the cylindrical capacitor of FIG. 2 with respect to piston position or piston travel.

FIG. 3 shows a diagram in which the capacitance of such a cylindrical capacitor is plotted against piston position or travel. It is seen from FIG. 3 that the change in capacitance is proportional to the travel of the piston, and the steepness of the curve is dependent on the ratio of the inside radius of the bore in the piston rod to the outside radius of the tube 7 as well as the relative dielectric constant $E_r$. The relative dielectric constant $E_r$ is predetermined in any known embodiment by the characteristics of the damping medium used. The two solid straight lines show two different cylindrical capacitor arrangements having, for example, different maximum overlapspacings between the piston rod 3 and the tube, or relative dielectric constants $E_r$ of the dielectric.

Figure 4:
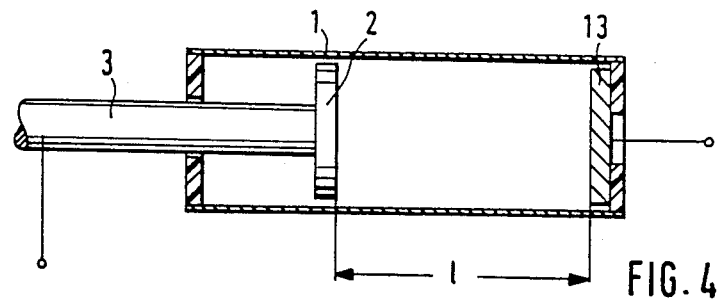
FIG. 4 shows a sectional view of a further embodiment of a vibration damper, in which the face of the piston and the base of the cylinder form plates of a capacitor.

FIG. 4 shows diagrammatically an alternative, second capacitive embodiment of the invention illustrating a vibration damper again having a cylinder 1, a piston 2 and a piston rod 3. The piston 2 and the base 13 of the cylinder respectively form the first and second electrodes of a capacitor. The base 13 of the cylinder 1 is mounted in this cylinder 1 but insulated therefrom so that a desired change in capacitance can be obtained by varying the distance between the piston 2 and the base 13 of the cylinder 1. By appropriate conversion of the measured value, likewise in this embodiment, the position of the piston can be obtained.

Figure 5:
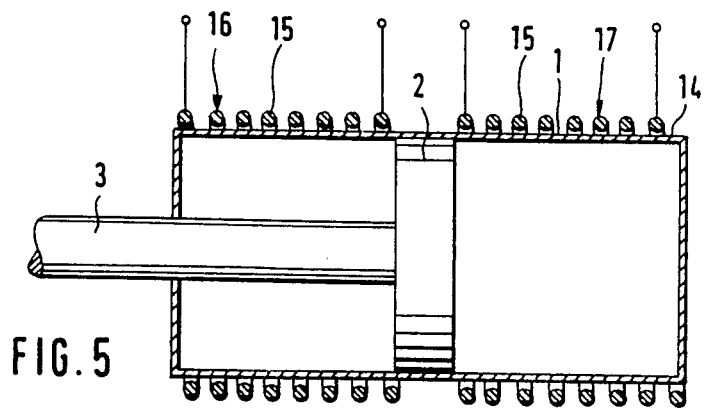
FIG. 5 shows a sectional view of a cylindrical vibration damper wherein an inductive coil is disposed on the surface of the cylinder.

As an alternative inductive embodiment, there is shown in section in FIG. 5, a vibration damper wherein again the principal components are the cylinder 1, the piston 2 and the piston rod 3.

The outer surface 14 of the vibration damper cylinder 1 is provided with windings 15, comprising a first coil 16 and a second coil 17, for respective generation of a magnetic field. The coils 16 and 17 when connected appropriately as the arms of a half-bridge generate a positional signal indicative of the position of the piston 2.

The resultant inductive half-bridge generates a bridge voltage determined by the degree or position of the insertion of the piston 2 in the damper cylinder, so that, a suitable signal corresponding to the piston travel is produced.

Figure 6:
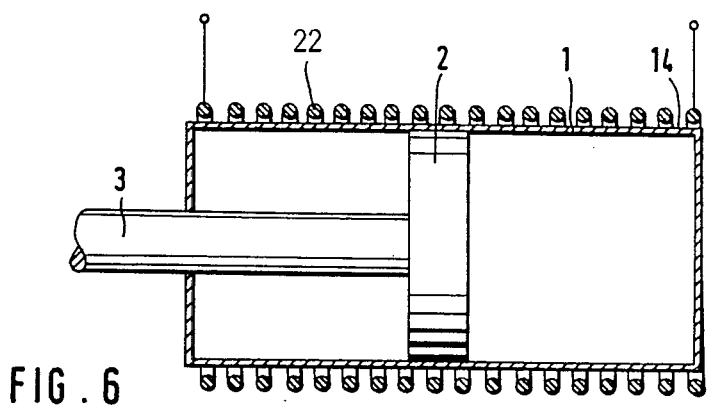
FIG. 6 shows a sectional view of a vibration damper with another coil arrangement.

FIG. 6 shows a modified inductive embodiment. The principal components of a vibration damper are here again the cylinder 1, the piston 2 and the piston rod 3. This piston rod 3 does not have to be made hollow in the embodiments using inductance. A winding is disposed on the outer surface of the vibration damper cylinder 1 extending preferably over at least the entire range of travel of the piston. On insertion of the piston within this region, there is a resulting change in inductance which can be correspondingly evaluated. The piston rod 3, at least, in FIG. 5 and FIG. 6, is preferably made of a ferromagnetic material in order to vary the inductance as much as possible from one relative position of the piston 2 and piston rod 3 to another position thereof.

Figure 7:
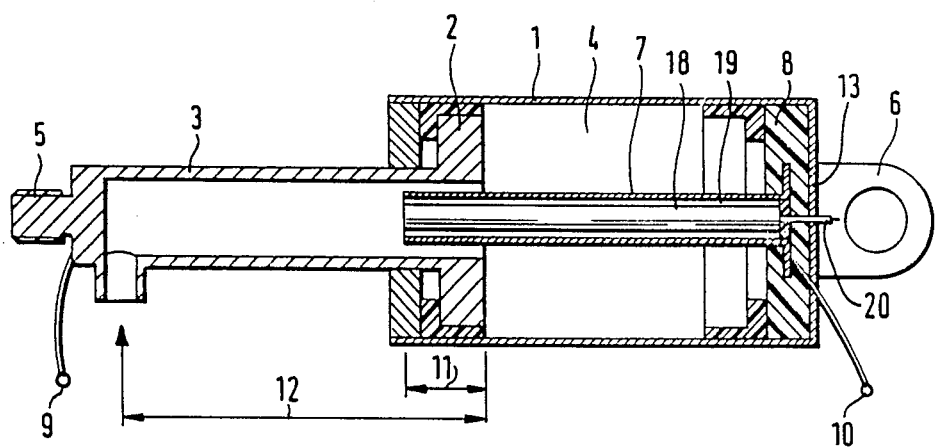
FIG. 7 shows a sectional view of a vibration damper in which the tube forms, with a further cylindrical tube, a second fixed capacitor.

The vibration damper illustrated in FIG. 7 comprises a fourth capacitance embodiment of the invention which is made up of basically the cylinder 1, the piston 2 and the piston rod 3 as in FIG. 1. Within the interior cavity 4 of the cylinder 1, there is the damping medium serving for damping vibrations. As in the embodiment of FIG. 1, mounting means 5 and 6 are provided for mounting the damper in the vehicle in a manner well-known in the prior art. The piston rod 3, which is made hollow, can slide telescopically over the tube 7, the tube 7 being secured in the cylinder in an insulating body 8 and being insulated with respect to the remainder of the components of the damper. The hollow piston rod 3 and the tube 1 form together the cylindrical capacitor. The damping medium present in the interior cavity 4 preferably forms the dielectric for the capacitor as in FIG. 1. The hollow piston rod 3 forms the first electrode and the tube 7 forms the second fixed electrode and is connected through the lead 10, passing through an insulated terminal arrangement (not shown), to the input of an appropriate measurement device such as shown in FIG. 8 infra.

The steepness of the change in capacitance is dependent upon the spacing between the outer surface of the tube 7 and the inner surface of the hollow piston rod 3 and on the dielectric medium present between them. The hollow piston rod 3 is arranged to be coaxial with and spaced from the tube 7; the space between them receives a suitable dielectric.

The spacing 11 represents the minimum overlap and the spacing 12 the maximum overlap between the two surfaces, producing accordingly a minimum and a maximum capacitance, which, appropriately converted, indicate the momentary piston travel, i.e., the position of the piston in the cylinder.

Secured within the cylindrical interior 19 of the tube 7 is a further tube 18 which is likewise arranged spaced from the tube 7. Between the two tubes, the damping fluid here again acts preferably as a dielectric as in FIG. 1; the dielectric may be solid. By the fixed arrangement of the two tubes 7 and 18 with respect to one another, there is produced a capacitor having a fixed capacitance at a particular temperature and pressure. The cylindrical tube 18 which acts as the further electrode is mounted in the insulating body 8 of the cylinder again in an insulating manner and is connected to the measurement receiver through a lead 20. The tube 7 and the tube 18 again form a tubular circular capacitor which serves for compensation of the measurement signal deviation caused by the pressure and temperature influence between the tube 7 and the piston rod 3. The manner of operation of the overall system is well-known in the prior art of Wheatstone Bridge as a capacitive half-bridge.

In FIG. 8, a schematic diagram is shown representing a bridge circuit 108, e.g., an impedance Wheatstone Bridge, for sensing the changes in capacitance of a variable capacitor 110 formed by the tube 7 and the hollow piston rod 3. The leads 9 and 20 are connected in the bridge 108 so that the capacitor 110 forms half on one arm of the bridge 108. Either a fixed capacitor external to the vibration damper or a temperature variable capacitor, as shown in FIG. 7, and formed by the tube 7 and the tube 18, comprises a capacitor 112 forming one-half of the bridge 108 connected to the capacitor 110. Two other impedance elements, such as capacitors, 114 and 116, form the other half of the bridge 108. Series capacitors 110 and 112 form one arm and the series impedances 114 and 116 form the other arm of the bridge 108. A generator 118, preferably supplying alternating current, is connected across the bridge 108 at the connectors between the capacitors 110 and the impedance 114 and the capacitor 112 and the impedance 116. The operation of a Wheatstone Bridge is well-known in the electrical prior art.

It is within the purview of the invention that this generator 118 may also be a generator of direct voltage if the impedance levels of the bridge 108 are appropriate therefor. Alternatively, within the purview of the invention, a pulse generator may also be used under special circumstances. The terminal 10 forms one input of an amplifier 120; a junction of the impedances 114 and 116 forms the other input of the amplifier 120 which generates a signal proportional to the position of the piston 2.

Figure 9:
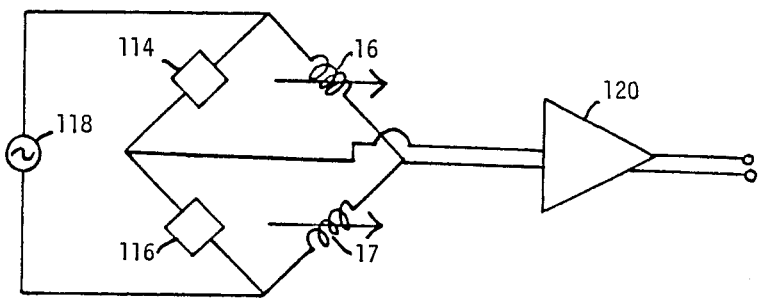
FIG. 9 shows schematically the inductive coil arrangement of FIG. 5 connected into an impedance measuring bridge.

In the case of the inductive coil embodiment of the invention as shown in FIG. 5 being adapted to the circuit in FIG. 8, the first coil 16 replaces the capacitor 110 and the second coil 17 replaces the capacitor 112 as in shown in FIG. 9. The other impedances 114 and 116 are preferably replaced by capacitors.

However, other impedance elements may be used for capacitors 114 and 116 if their impedance is chosen appropriately in a manner which is well known in the impedance bridge art.

For example, if the capacitive impedances 110 and 112 in FIG. 8 both increase by the same percentage amount due to change in the mutual dielectric because of temperature, pressure, etc., the voltage at the terminal 20 will remain constant, as is well-known in the art of electrical bridge measurements such as the Wheatstone Bridge.

Figure 10:
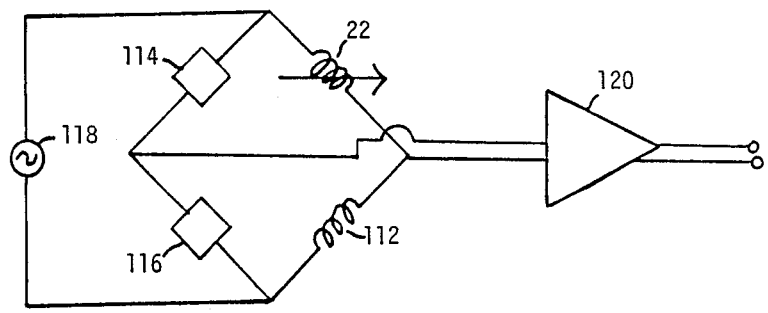
FIG. 10 shows schematically the coil arrangement of FIG. 6 connected into an impedance measuring bridge.

FIG. 10 shows the coil arrangement 22 of FIG. 6 connected into the bridge 108 replacing the capacitor 110.

Figure 11:
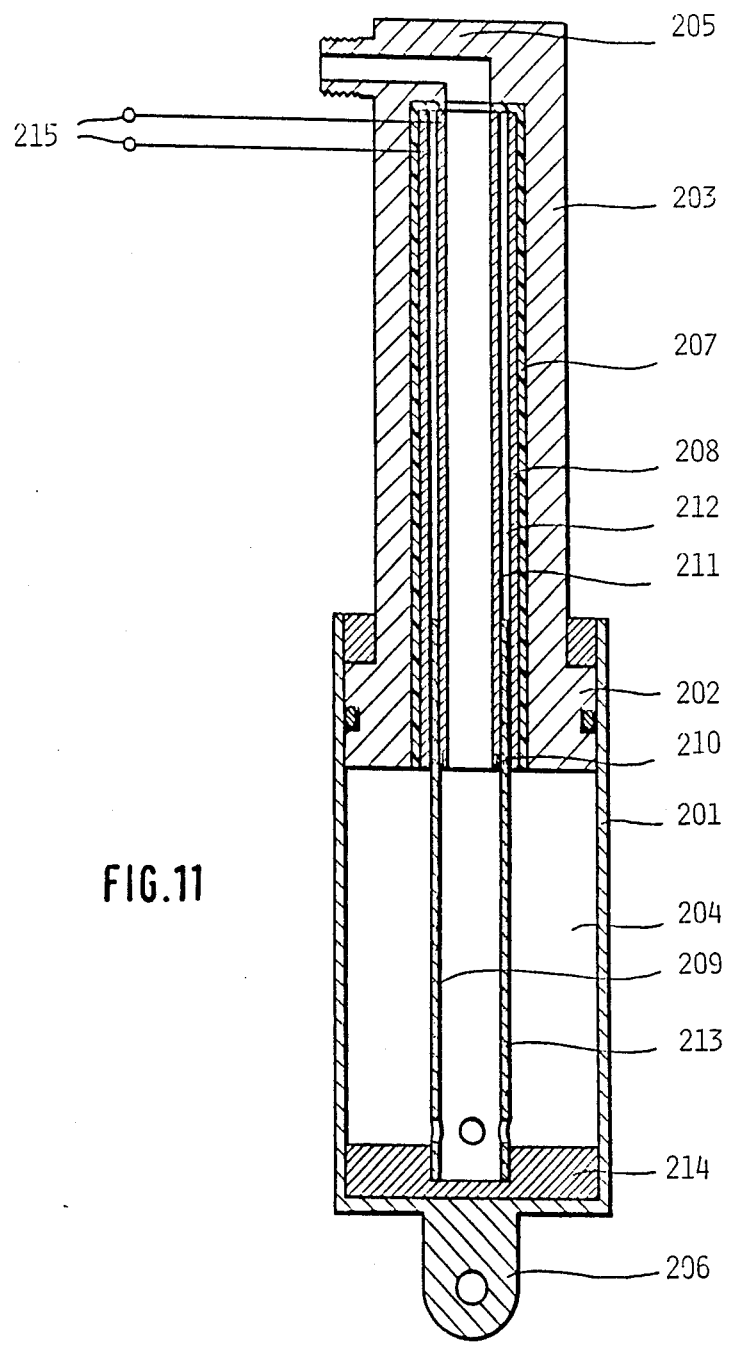
FIG. 11 shows a sectional view of another embodiment of which a tubular capacitor is arranged in the interior of the piston rod.

The vibration damper illustrated in FIG. 11 generally comprises the cylinder 201, the piston 202 and the piston rod 203. In the interior cavity 204 of the cylinder 201, there is provided a damping medium serving for damping the vibrations. Attachment means 205 and 206 are provided for mounting the vibration damper on the vehicle.

The piston rod 203 is made hollow, and therewithin are disposed a first electrode 208 and the second electrode 211. The first electrode 208 is insulated from the piston rod 203 by an insulating layer 207. Between the first electrode 208 and the second electrode 211 is a gap 212.

Since the first electrode 208 is substantially concentric to and spaced away from the second electrode 211, the tubular body 213, which is secured to the base 214 of the cylinder 201, can enter the gap 212 axially during operation of the damper in the vehicle. By the entry of the tubular body 213, a variation occurs in the capacitance between the first electrode 208 and the second electrode 211.

In the specific embodiment of FIG. 11, a ceramic tube is provided as the tubular body 213. The variation in capacitance arises because of different dielectric characteristics of the ceramic tube and the rest of the medium which may be oil.

The ceramic tube and the mineral oil which is present as the damping fluid each have a different dielectric constant, and on insertion of the ceramic tube 213 in the gap 212, the immersed surface of the ceramic tube acts as a different dielectric from oil.

In order to eliminate as far as possible the effect of the oil in the gap, between the electrode 211 and the ceramic tube 213, the ceramic tube 213 is provided with an electrically conducting surface on its inner cylindrical surface 209. This conducting surface is electrically connected to the second electrode 211 by an electrically conducting ring 210 provided on the outer surface of the second electrode 211. Since the inner cylindrical surface 209 electrically becomes a part of the second electrode 211, the oil in the gap between the second electrode 211 and the ceramic tube 213 does not have any electric field generated therein. Therefore, this gap does not produce any capacitive effect and thereby variations in this gap due to tolerances, wear of the parts, etc., do not deleteriously affect the performance accuracy.

By virtue of the arrangement of the electrodes 208 and 211 either in the hollow piston rod 203 or in the cylinder 201, structurally preferred possibilities are provided for making the connections for the leads 215. The leads could be made to terminate as connecting terminals on the outer surface either of the cylinder 201 or the piston rod 203. The electrodes 208 and 211 are held fixed relative to one another. The tubular body 213 is fixed also; however, the tubular body is mounted in the cylinder 201 so that during operation of the vibration damper, a telescopic displacement of the components within each other takes place, and the tubular capacitor can perform as desired.

Figure 12:
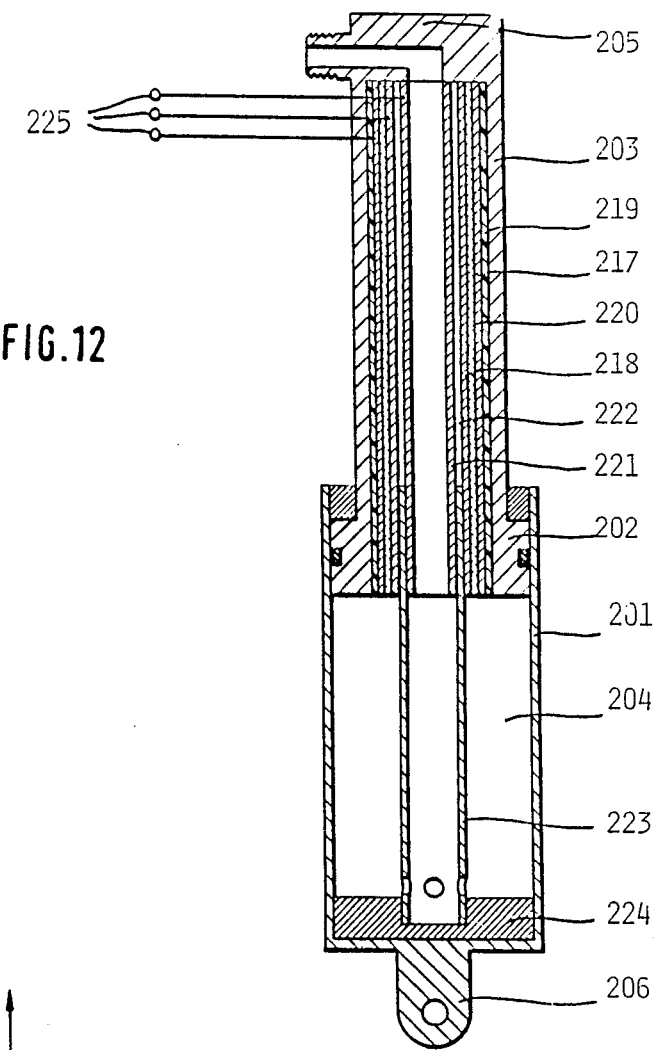
FIG. 12 shows a sectional view of a vibration damper in which a second fixed capacitor is mounted in the interior of the piston rod.

The vibration damper illustrated in FIG. 12 comprises substantially the cylinder 201, the piston 202 and the piston rod 203. In the interior cavity 204 of the cylinder 201, there is the damping medium serving for damping the oscillations. Securing devices 205 and 206 are provided as attachment means for mounting the damper in the vehicle.

Provided in the piston rod 203, which is made hollow, are the first electrode 217 and the second electrode 218. The first electrode 217 is insulated with respect to the piston rod 203 by a tube 219 of, for example, synthetic resin. A dielectric 220 is disposed between the first electrode 217 and the second electrode 218.

Spaced away from the second electrode 218 is a third electrode 221. The tubular body 2Z3 is disposed to be able to enter the intermediate space 222 between the second electrode 218 and the third electrode 2Z1 during active functioning of the damper in the vehicle. By the insertion of the tubular body 223 into the space 222, there occurs a change of capacitance between the second electrode 218 and the third electrode 221. The first electrode 217 forms, together with the second electrode 218, a fixed capacitance by contrast. The space 222 may be filled with a dielectric fluid, e.g., mineral oil.

Preferably, as illustrated, the tubular body is metallic; with the use of an electrically conducting tubular body 223, the latter must be earthed through the insulating body 224 of the cylinder. This results in the following manner of operation: with the piston rod 203 extended, the three electrodes form two fixed capacitances of known magnitude. On inward movement of the grounded electrically conducting tubular body 223, the capacitance between the second electrode 218 and the third electrode 221 is reduced because the effective capacitive surface area is diminished.

As an alternative in regard to the material of the tubular body 223, it is also possible for the tubular body 223 to be made in the form of an electrically non-conducting tube. For example, a tube of synthetic resin is suitable for this purpose. If a synthetic resin tube is provided to form the tubular body 223 then on entry of the synthetic resin tube between the second electrode 218 and the third electrode 221, there is produced a parallel circuit of two capacitors. The two capacitances of different values arise by the different dielectrics so that the overall capacitance of the second electrode 218 and the third electrode 221 results from the addition of the two individual capacitances. These different values of capacitance arise partly since the synthetic resin tube and the mineral oil which may be present as the damping fluid, each have different dielectric constants. If the tubular body 223 is made of synthetic resin, on insertion of the synthetic resin tube, the inserted surface area of the tubular body 223 acts as a dielectric.

The variable capacitance follows the formula:

$$C_{ges}(1) = C_a + C_b$$

where:
$C_{ges}$ = overall capacitance
$C_a$ = the individual capacitance of the first medium (e.g. Mineral oil)
$C_b$ = the individual capacitance of the second medium (e.g. Synthetic resin)

Figure 13:
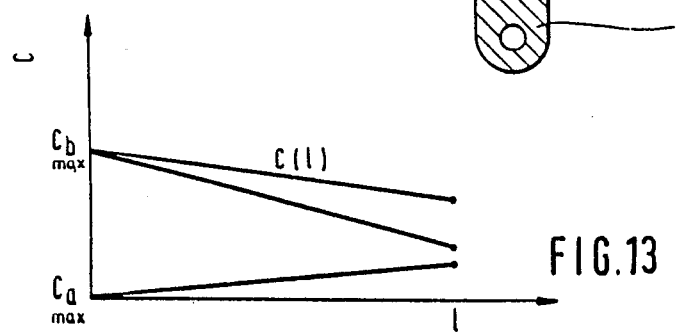
FIG. 13 depicts a piston travel/capacitance diagram for a cylindrical capacitor.

In FIG. 13, a diagram is shown in which the capacitance for such a cylindrical capacitor is drawn against piston travel or displacement. The individual capacitance $C_a$ falls steadily on insertion of the piston 202, whereas the individual capacitance $C_b$, in which the tubular body 223 is used as the dielectric, steadily increases. The two individual capacitances add up and form the resultant characteristic line $C_{ges}$.

By the disposition of the electrodes 217, 218 and 221, the leads 225 since these only need to be mounted as connecting pins on the outside surface of either the cylinder 201 or the piston rod 203. The electrodes are advantageously kept fixed relative to one another, and the tubular body 223 is likewise fixed, but in the other component. Accordingly during the action of a vibration damper, a telescopic displacement of the parts within one another takes place, so that the desired measured variable capacitance is formed.

Figure 14:
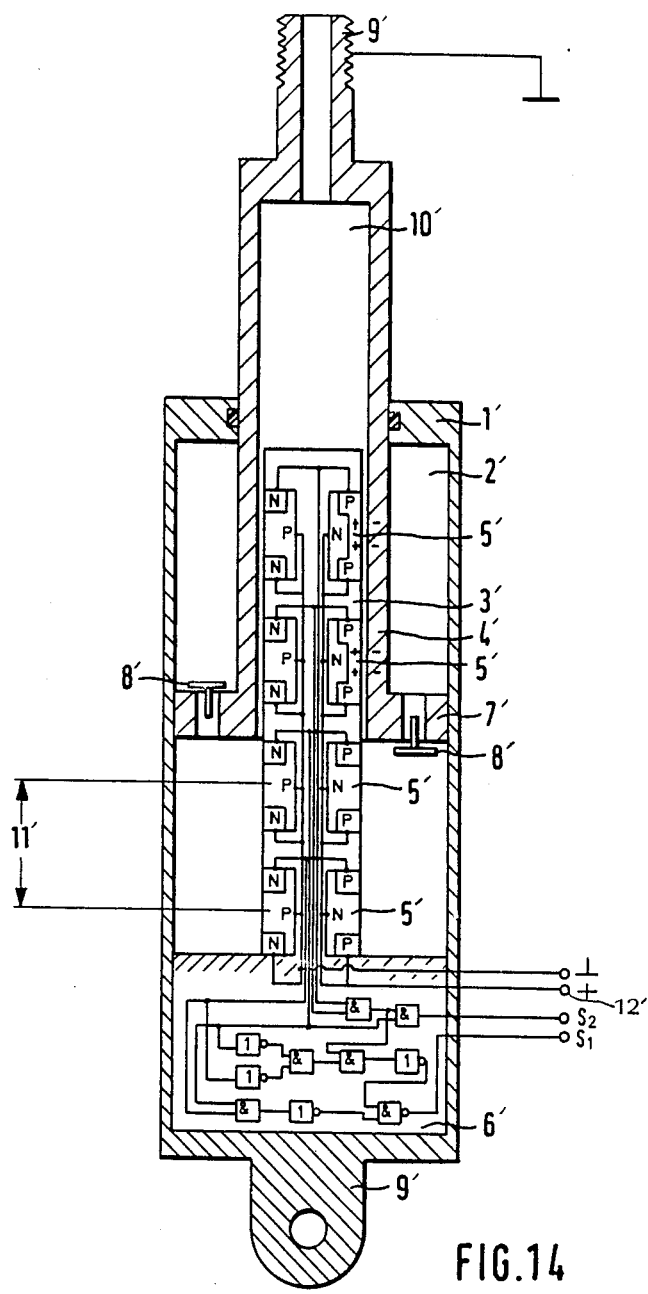
FIG. 14 shows, in cross section, a piston-cylinder unit, in the form of a vibration absorber, having semiconductor elements therein.

The equipment illustrated in FIG. 14 comprises essentially a cylinder 1', an interior portion 2' of which a piston rod 4' guides an axially-movable piston 7'. Such a vibration absorber is filled in the interior portion 2' of the cylinder 1' with at least one damping medium. The piston 7' thereby serves as a vibration absorber, whereby there are valves 8' which perform a throttling function. To fasten the assembly between a wheel mount and the body, there are fastening devices 9'.

The piston rod 4' is provided with a cavity 10' into which a beam 3' is inserted. The beam 3' permits a free axial movement of the piston 7' in the cylinder 1'. The beam 3' is equipped with semiconductor elements 5', which are preferably located in the beam 3' at uniform intervals over a range of, or the entire axial stroke length of, the piston 7'. The distance 11' between and the density of the individual semiconductor elements 5' is determined by the specified measurement value resolution required for a desired application. Depending on whether these semiconductor elements 5' are closer to or farther from one another, when these semiconductor elements 5' are covered by the piston rod 4', a signal corresponding to the resolution of the semiconductor elements 5' and the location of the piston 7' is sent to the electronic calculating or computing circuitry or system 6'. For this purpose, in this embodiment, the piston rod 4' is designed as an electrode, and either has an electrical voltage source connected thereto, or is connected to ground. An electrical voltage source 12' is chosen having such a voltage that an electric field is set up between the semiconductor elements 5' and the piston rod 4' with its connected piston 7', which is sufficiently large to form a gate channel, such as that of a field effect transistor in the semiconductor elements 5' immediately adjacent to the piston rod 4' with its connected piston 7' thereby actuating these adjacent semiconductor elements 5' by either turning them on or off, depending upon whether the semiconductor elements 5' are designed and manufactured to operate in their enhancement mode or their depletion mode.

The operational characteristics of the equipment are preferably chosen so the fact that the semiconductor elements 5', which are covered by the hollow piston rod 4', have a conductive channel, which is either P-conducting or N-conducting, depending on the design of the semiconductor elements 5' and on the relative potential on the piston rod 4' with respect to the semiconductor elements 5'. In FIG. 14, the piston rod 4' is connected to ground, and the semiconductor elements 5' are therefore chosen to be P-conducting and are connected to the power supply 12', which is positive. This conductivity state means that there is a "high" signal at the inputs of the digital computing elements.

The inputs of the digital computing elements from the semiconductor elements 5', which are not covered by the hollow piston rod 4', are in the "low" state. By connecting the digital computing elements according to a determined solution algorithm, a two-place digital distance signal is produced, which reflects the following four states and, therefore, the corresponding positions of the piston 7'.

| S<sub>1</sub> | S<sub>2</sub> | Distance (mm) |
|---|---|---|
| 0 | 0 | 0–40 |
| 0 | 1 | 40–80 |
| 1 | 0 | 80–120 |
| 1 | 1 | 120–160 |

This table describes one example.

The semiconductor elements 5' are connected to an electronic calculating circuit 14'. One example of such a circuit is shown in FIG. 14, which has AND circuits and inverter circuits interconnected as shown.

Figure 15:
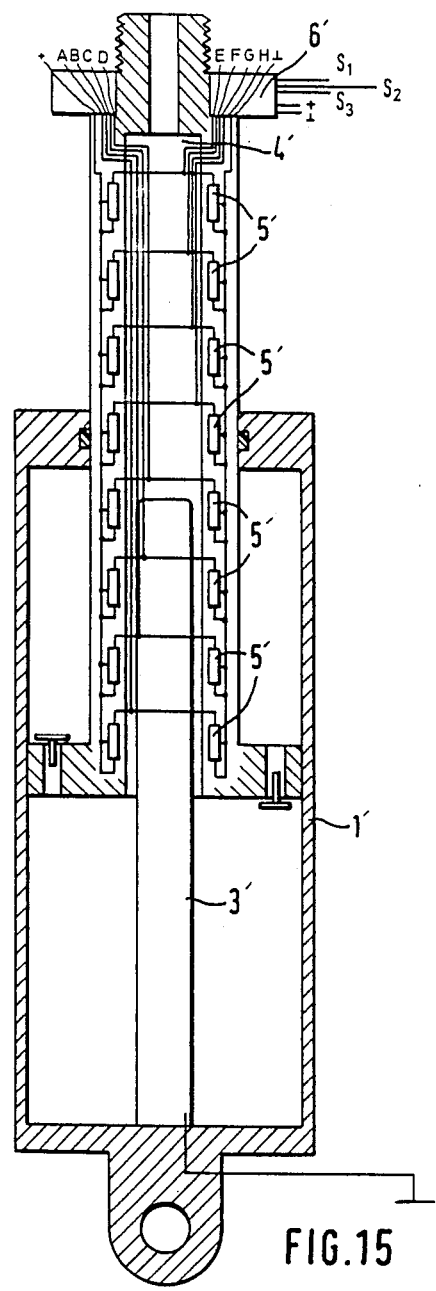
FIG. 15 shows another embodiment of the piston-cylinder component illustrated in FIG. 14, with the distinction that the semiconductor elements are an integral part of the piston rod.

FIG. 15 shows a vibration absorber, basically like the one illustrated in FIG. 14, in which the beam 3' is designed as an electrode, with either an electrical voltage or a ground potential connected thereto. The semiconductor elements 5' are arranged on the inside surface of the hollow piston rod 4' and insulated therefrom and one another in such a way that when there is a telescopic displacement of the piston rod 4' in relation to the cylinder 1', a corresponding overlap is achieved between the semiconductor elements 5' and the beam 3', so that, again, a corresponding measurement signal is sent to an electronic calculating or computing circuit or system 6'. The semiconductor elements 5' are interconnected by a series of conductors A through H, which in turn are connected to the electronic calculating system 6'. The electronic calculating system 6' is preferably connected in an analogous fashion to the electronic circuit of FIG. 14. Electronic circuits of this type are very well known in the art and are used, among other applications, in digital watches, etc. Otherwise, this embodiment corresponds in terms of its function as a vibration absorber to the embodiment already illustrated in FIG. 14.

Figure 16:
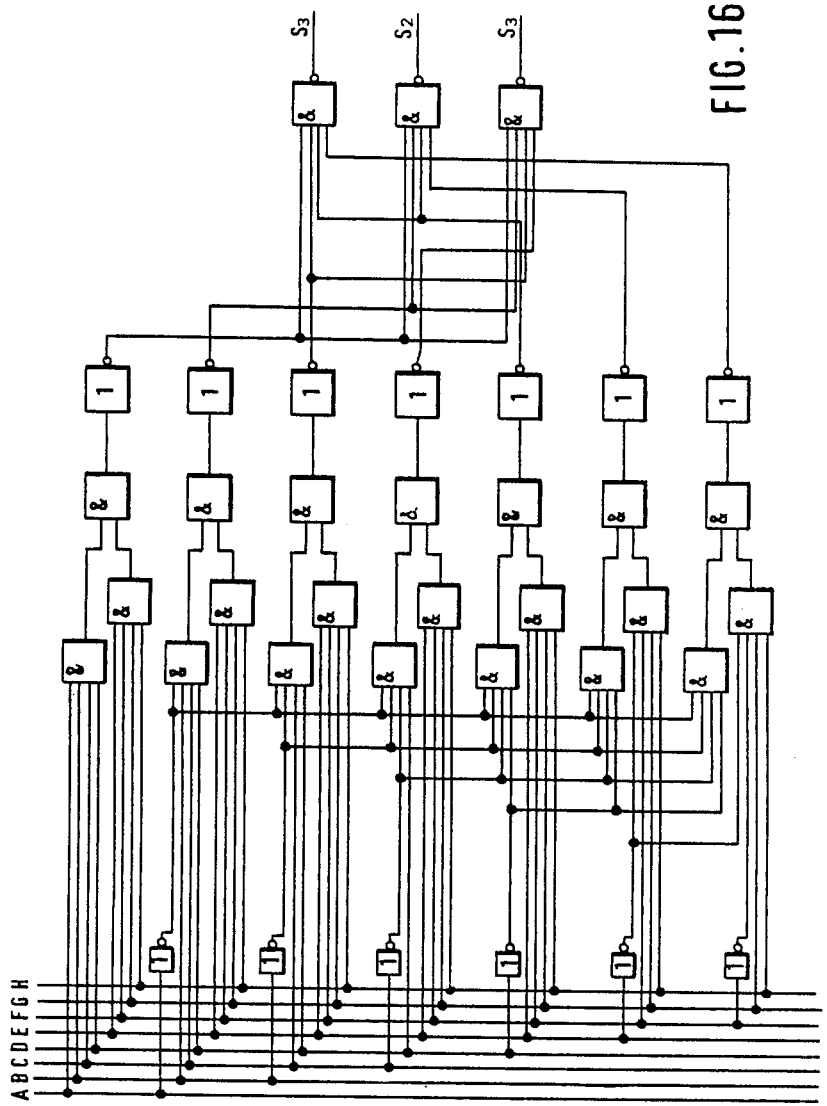
FIG. 16 shows a circuit diagram of an electronic computing system.

FIG. 16 shows a circuit diagram of an electronic calculating system, like that identified as 6' in FIG. 15. The states which are assumed by the semiconductor components as a function of the piston travel are transmitted via the connections A to H. The 3-place digital word S<sub>1</sub> to S<sub>3</sub> represents the digital distance signal, which can be directly processed in a digital electronic computing system.

Figure 17:
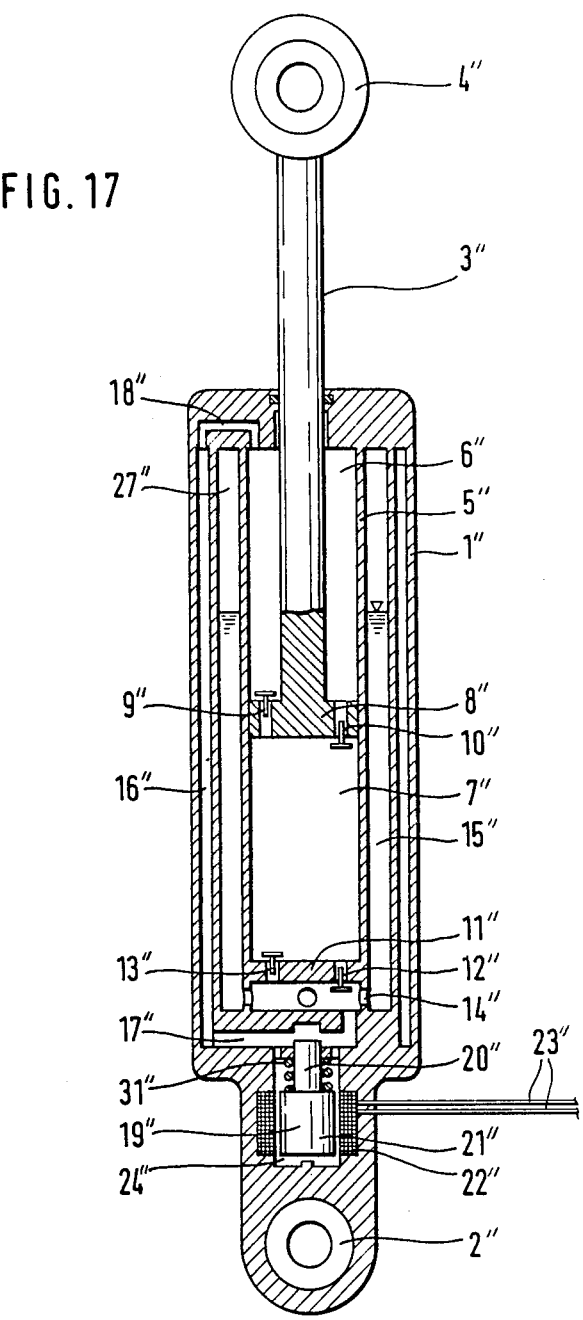
FIG. 17 shows a damping element including an electronically-controllable damping valve in cross section.

FIG. 17 shows the schematic illustration of a hydraulic vibration damping apparatus including the housing 1", which is connected by means of a lower coupling member 2" with a support wheel guidance element (not shown), and the piston rod 3", which is fastened by means of the upper coupling member 4" to the vehicle body. A work cylinder 5" is provided and includes the upper work chamber 6" and the lower work chamber 7" that are separated from one another by a damping piston 8" fastened to an end of the piston rod 3".

The damping piston 8" is equipped with a pressure damping valve 9" and a traction damping valve 10". In the bottom 11" of the work cylinder 5" there is provided another pressure damping valve 12" and a check valve 13". By means of the openings 14", the fluid volumes displaced by the piston rod 3" are displaced into the equalization chamber 15".

The annular space 16" outside of the equalization chamber 15" is connected through ducts 17" and 18" with the upper work chamber 6" and the equalization chamber 15", whereby the flow connection into the lower working chamber 7" from the equalization chamber 15" is provided through the openings 14" and the check valve 13". Operative with this flow connection is the electronically-controllable damping valve 19", whereby the armature shaft 20", depending on the control setting, closes the . duct 17" or allows a variable circulation of fluid through the duct 17". The damping valve 19" includes the armature shaft 20", the armature 21", the coil 22", the spring 31" and the electrical connection 23". The armature chamber 24" can be flooded with damping fluid medium.

The damping valve 19" is controlled with electric signals through the connections 23" by a suitable electronic system responsive to predetermined measured parameters, so that, depending on the position with which the armature shaft 20" acts on the cross-section of the duct 17", a determined damping characteristic can be achieved.

The equalization chamber 15" can, in its upper region 27", be filled with a gaseous medium, whereby, depending on the requirements and task at hand, this gaseous medium can be unpressurized or pressurized.

Figure 18:
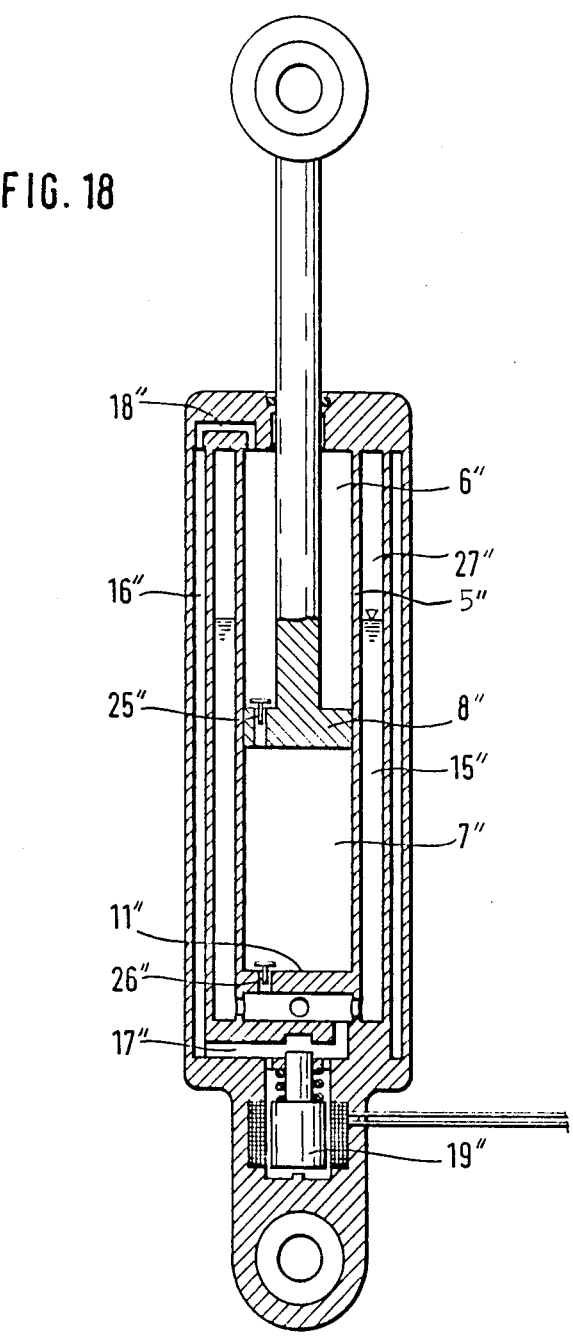
FIG. 18 shows a two-tube damper in principle like the one illustrated in FIG. 17, with the distinction that the damping medium circulators in only one direction.

FIG. 18 shows another embodiment of the present invention that is similar to the one already illustrated in principle in FIG. 17, but in which the damping piston 8" is only equipped with a check valve 25", and the bottom 11" of the work cylinder 5" is also equipped with a check valve 26", so that the damping fluid medium can only flow in one direction of circulation. This direction of circulation runs from the upper work chamber 6" through the duct 18" and the annular space 16", the duct 17", past the damping valve 19" and through the check valve 26" into the lower work chamber 7". For this damping element, the circulation of the damping medium is important, since the damping regulation provided is determined by operation of the cross-section setting of the armature shaft 20" of damping valve 19". The equalization chamber 15" can, in its upper region 27", be filled with a gaseous medium, which, depending on the task and the operating conditions, can either be pressurized or unpressurized.

Figure 19:
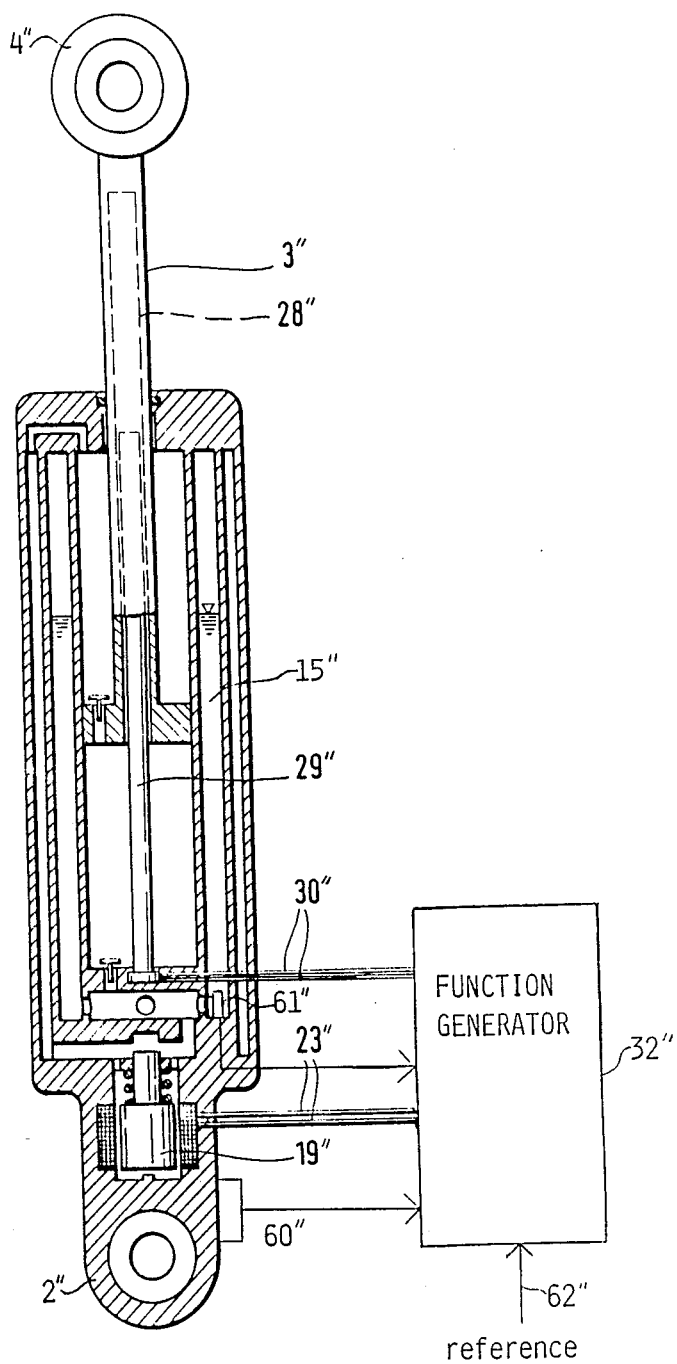
FIG. 19 shows a two-tube damper in principle like the one illustrated in FIG. 18, with a sensor integrated in the hollow piston rod and a function generator provided for operating the controllable damping valve.

FIG. 19 shows a different embodiment of the present invention that is similar to the one already illustrated in FIG. 18, with the difference that the piston rod 3" is provided with a hollow space 28", which is operative to hold a sensor 29". This sensor 29" supplies to a suitable electronic function generator 32" through the connections 30" a control signal corresponding to the sensed relative movement between the coupling members 2" and 4" as measured by the sensor 29" and from there a control signal is provided through the connections 23" to provide the desired control of the damping valve 19". The sensor 29" can be designed on the basis of a tubular capacitor, whereby the tubular components form a capacitive half-bridge.

Figure 20:
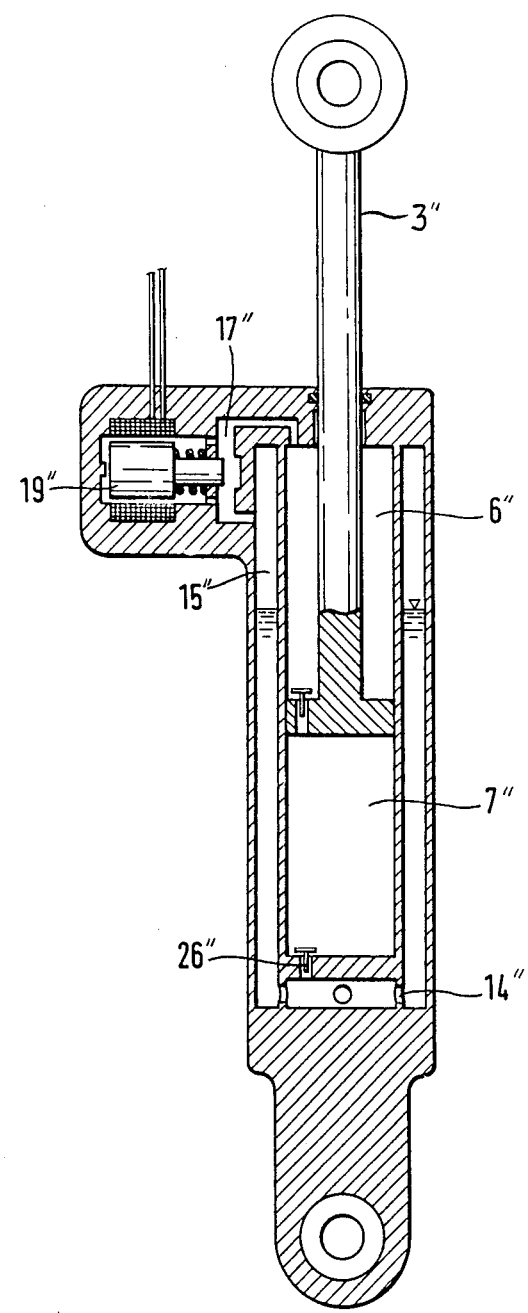
FIG. 20 shows a two-tube damper in principle like that illustrated in FIG. 18, in which the electronically-controllable valve is located laterally in relation to the longitudinal axis of the damper.

FIG. 20 shows an additional embodiment of the present invention which in principle corresponds to the one illustrated in FIG. 18, with the difference that the damping valve 19" is located laterally in relation to the longitudinal axis of the damping piston rod 3". Once again there is a fluid connection from the upper work chamber 6" through the duct 17" into the equalization chamber 15", whereby the fluid flow connection from the equalization chamber 15" into the lower work chamber 7" is provided through the openings 14" and the check valve 26". The damping valve 19" per se is of a design to function substantially the same as already shown and described in relation to the other embodiments.

Figure 21:
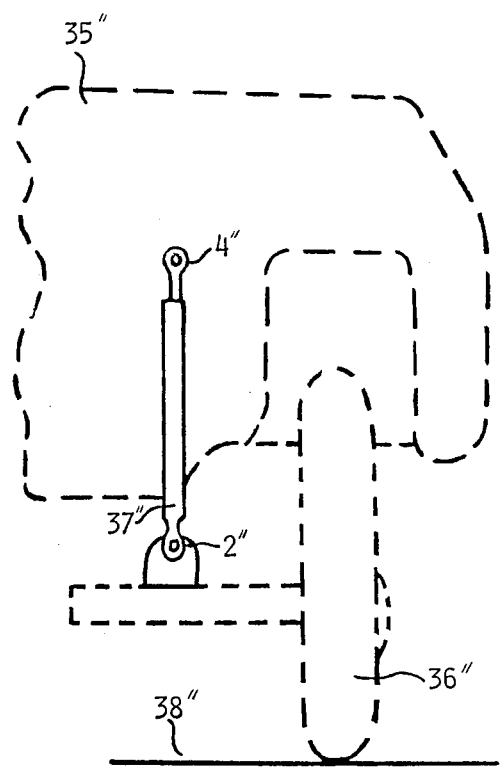
FIG. 21 shows schematically the practical application of the present hydraulic vibration damper apparatus coupled between the body and a support wheel of a vehicle.

In FIG. 21, there is schematically shown an illustrative practical application of the vibration damping apparatus of the present invention in relation to a vehicle including a vehicle body 35" having a support wheel 36". The hydraulic vibration damping apparatus 37" is shown with the upper coupling member 4" fastened to move with the vehicle body 35" and the lower coupling member 2" fastened to move with the wheel 36". As the vehicle body 35" travels along a roadway 38", with the support wheel 36" in contact with that roadway 38", the support wheel 36" will move relative to the vehicle body 35", and the damping apparatus 37" will operate to damp undesired vibrations and relative movements between the vehicle body 35" and the support wheel 36" in response to sensed relative movement between the vehicle body 35" and the support wheel 36".

Figure 22:
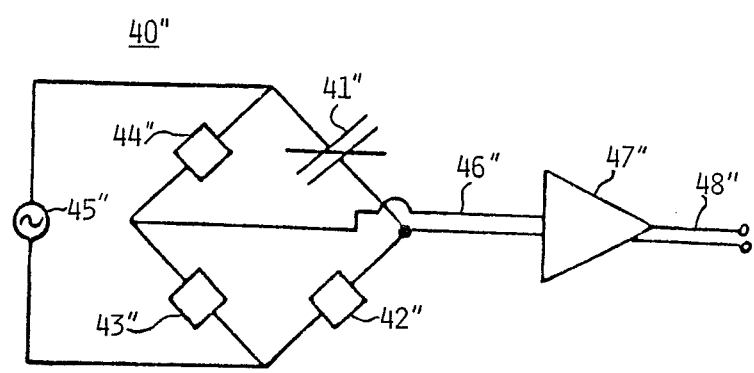
FIG. 22 shows an illustration of a suitable bridge circuit for sensing the changes in capacitance of the sensor shown in FIG. 19.

In FIG. 22 there is shown a well-known bridge circuit arrangement 40" for establishing the relative separation movement between the vehicle body 35" and the support wheel 36" as determined by changes in the capacitance of the sensor 29" through the connections 30" relative to the hollow space 28", as shown in FIG. 19, which functions as the variable capacitor 41" shown in FIG. 22. The variable capacitor 41", in conjunction with impedance element 42" which is preferably a capacitor, forms one-half of the bridge circuit 40". The capacitance magnitude of the capacitor 41" changes in a linear relationship to the separation between the vehicle body 35" and the support wheel 36". The magnitude of impedance element 42" is selected in accordance with a desired separation therebetween. Two other impedance elements 43" and 44" form the other half of the bridge circuit 40". A signal source 45" is connected across the bridge circuit 40" The operation of such a bridge circuit 40" is well known in the electrical prior art. The output signal 46" from the bridge circuit 40" is supplied to an amplifier 47" which outputs a signal at an output 48" in accordance with the separation movement of the sensor 29" in relation to the hollow space 28" within the piston rod 3", as shown in FIG. 19. This latter movement corresponds with the movement of the lower coupling member 2" connected with the sensor 29" and in relation to the hollow space 28" within the piston rod 3" connected with the upper coupling member 4".

Figure 23:
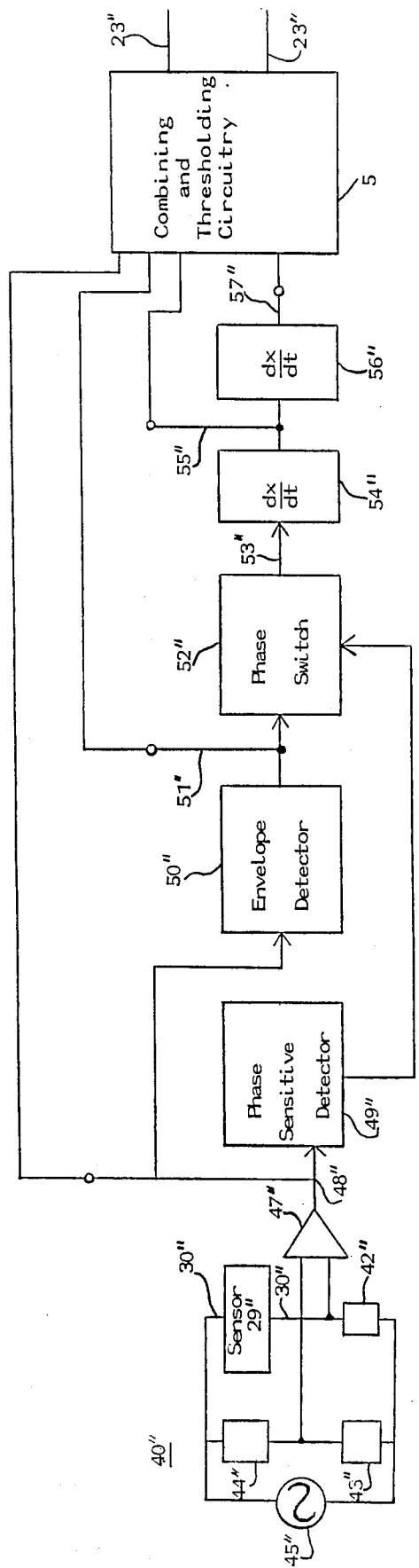
FIG. 23 shows the functional operations provided in accordance with the present invention.

In FIG. 23, there are shown the various functional operations of the vibration damping apparatus of the present invention. The bridge circuit 40" including the amplifier 47" provides the signal 48" to a phase sensitive detector 49" which senses the upward movement of the sensor 29" relative to the hollow space 8", as shown in FIG. 19, as compared with the downward movement of that sensor 29". The envelope detector 50" senses the magnitude of the signal 48" to provide an output signal 51" in accordance with the movement distance of the sensor 29". The phase switch 52" provides an output signal 53" in accordance with the magnitude and the direction of movement of the sensor 29" as provided by the signal 48". The derivative circuit 54" takes a first differential of the signal 53" to provide an output signal 55" in accordance with the velocity of the movement of the sensor 29"The derivative circuit 56" takes a second differential of the signal 53" to provide an output signal 57" in accordance with the acceleration of the movement of the sensor 29". The signals 48", 51", 55" and 57" are summed and/or combined and thresholded and/or compared with reference signals in summing and thresholding circuitry 57", which circuitry generates output signals for connection to the electrical connection 23" of the coil 22".

The function generator 32", shown in FIG. 19, can comprise a programmed microprocessor including a software program for providing the functional operations as shown in FIG. 23. If it is desired to establish the damping force provided by the present vibration damper apparatus, a strain gauge 60" can be fastened to the lower coupling member 2", as shown in FIG. 19, for this purpose. If it is desired to establish the temperature of the damping fluid provided within the present vibration damping apparatus, a temperature sensing member 61" can be provided within the equalization chamber 15", as shown in FIG. 19, or in contact with the damping fluid as may be desired. The function generator 32" which preferably includes the circuitry or functions of FIG. 23 can include one or more reference signals 62" for comparison with the sensed operating parameters of the vibration damping apparatus, such as damping force, movement distance, velocity, acceleration, temperature or frequency of operation as may be desired.

The sensed parameter signals generated can be combined (in an appropriate manner) to produce a combined or resulting difference or error signal, if desired. This resulting difference or error signal is then applied to the damping valve 19" for controlling the operation of the vibration damping apparatus.

Figure 24:
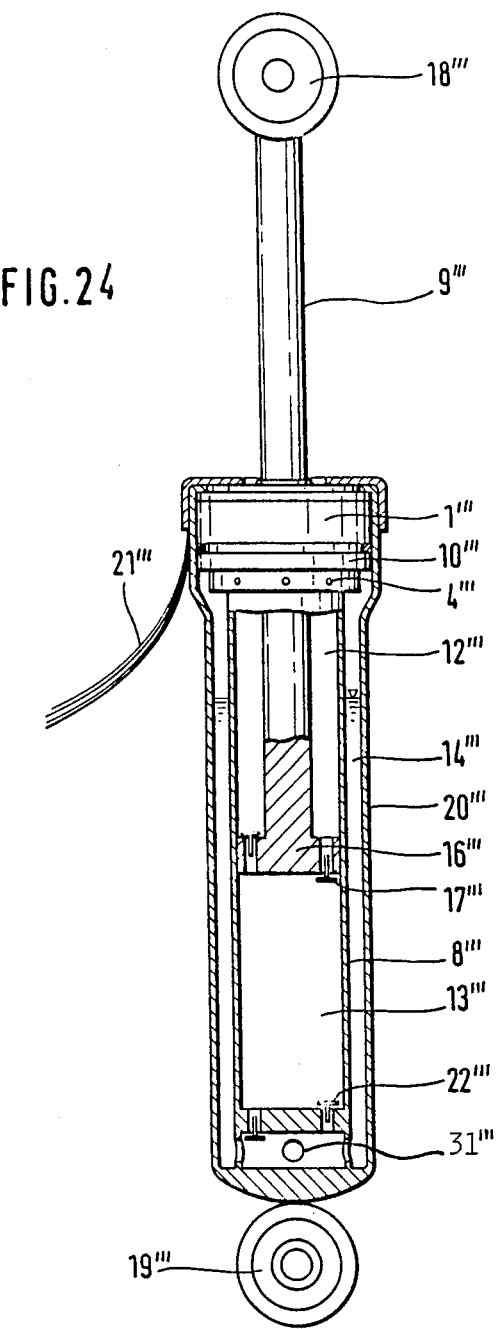
FIG. 24 shows a vibration damper in cross section.

The hydraulic vibration damper illustrated in FIG. 24 shows essentially a damping or work cylinder 8''' and a piston rod 9''', on the end of which a piston 16''' is affixed. The piston 16''' divides the interior of the damping cylinder 8''' into an upper work chamber 12''' and a lower work chamber 13'''. The piston 16''' has valves 17''', which are used for basic damping. Fasteners 18''' and 19''' are provided to fasten the vibration damper to the vehicle.

The damping cylinder 8''' is surrounded by a casing tube 20''', whereby an equalization chamber 14''' is formed in the space in between. Between the equalization chamber 14''' and the upper work chamber 12''', there are corresponding flow connections 4'''. These flow connections 4''' are a part of a guide component 10''', which simultaneously holds the damping valve 1'''. The damping force regulation takes place via the damping valve 1''', in which the flow from the upper work chamber 12''' to the equalization chamber 14''' is regulated. The electrical control of the damping valve 1''' is exerted via connection lines 21'''. The compensation of the immersed piston rod volume during operation is accomplished by means of bottom valves 22''', which connect the lower work chamber 13''' with the equalization chamber 14''' by means of orifices 31''' in a bottom portion of the hydraulic vibration damper.

Figure 25:
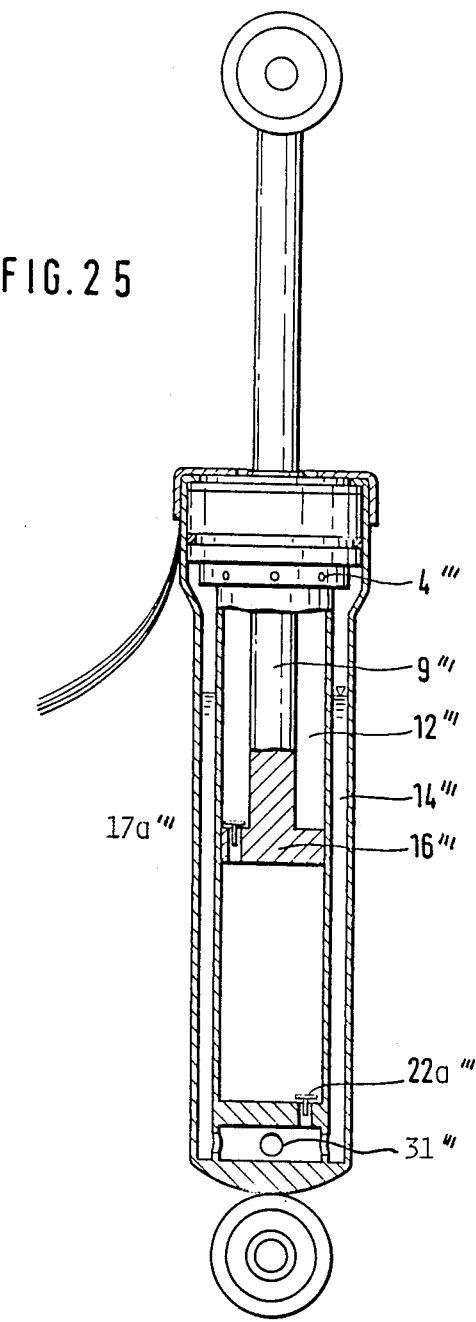
FIG. 25 shows another embodiment of the vibration damper illustrated in FIG. 24, in cross section.

FIG. 25 shows a vibration damper essentially like the one illustrated in FIG. 24, with the distinction that the piston 16''' has a valve 17a''' which acts in only one direction. The bottom valve 22a''' comprises a valve which also acts in a single direction. These valves 17a''' and 22a''' are used only for volume compensation of the immersed piston rod 9'''. As in the embodiment illustrated in FIG. 24, the damping takes place from the upper work chamber 12''' via the flow connections 4''' into the equalization chamber 14'''.

Figure 26:
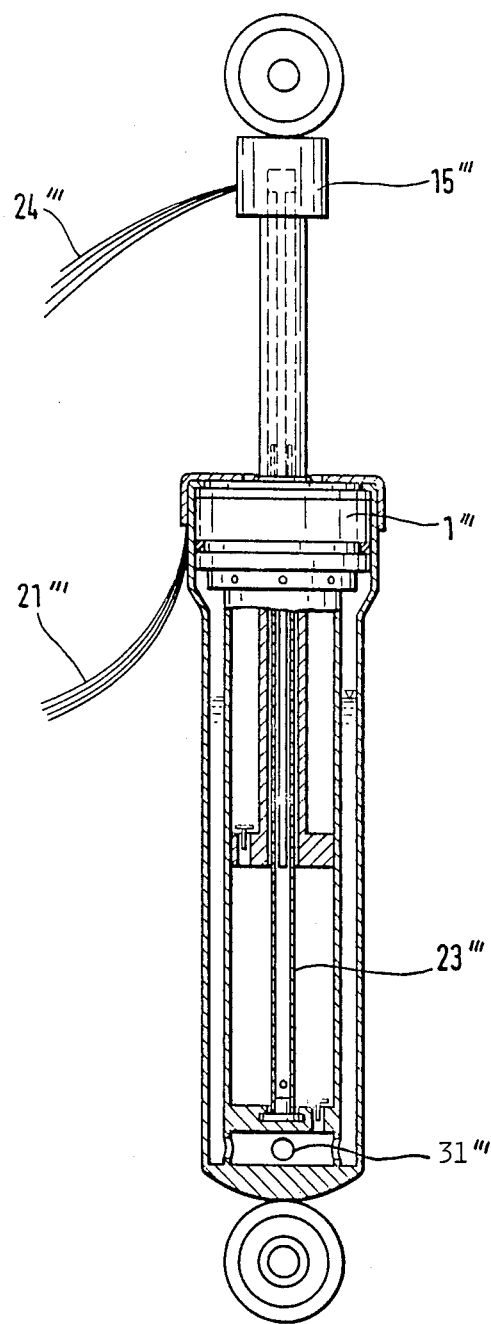
FIG. 26 shows a vibration damper, essentially like the one illustrated in FIG. 25, with an integrated sensor, in cross section.

FIG. 26, in contrast to the embodiment shown in FIG. 25, is equipped with an additional sensor 23''', which corresponds to the embodiments shown in FIGS. 1, 7, 11, and 13 supra and which collects the measurement signals via the connections 24'''. When a corresponding electronic system is used, the sensor 23''' appropriately regulates the damping valve 1''' via the connection lines 21'''. The sensor 23''' for the measurement of the piston velocity, piston travel, piston acceleration, pressure, temperature and load status is an apparatus employing the tubular capacitor principle which supplies appropriate measurement signals concerning the change in capacitance. The sensor 23''' can also use other types, however, for example as shown in the embodiments illustrated in FIGS. 5, 6, 14, 15, 19 and 23 and explained supra, which also work together with the adjustable damping valve 1''' by means of an electronic measurement system 15''', such as shown in the embodiments illustrated in FIGS. 8, 9, 10, 16, 19, 22 and 23, and explained supra.

Figure 27:
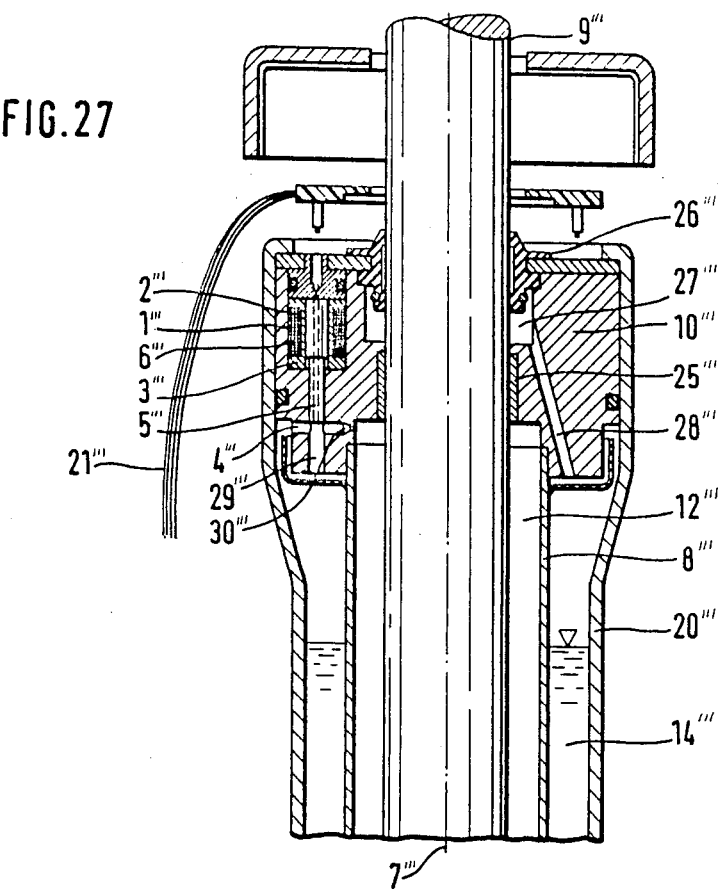
FIG. 27 shows a damping valve located in the piston rod guide component, in cross section;.

FIG. 27 shows a segment of a vibration damper in cross section, in which the piston rod 9''' is guided by a guide component 10'''. The damping cylinder 8''' forms the equalization chamber 14''' together with the casing tube 20'''The guide component 10''', via a bushing 25'-, guides and centers the piston rod 9''', whereby the piston rod gasket 26''' seals the work chamber 12''' and the equalization chamber 14''' from the atmosphere. The bushing 25''' is wetted by damping fluid which is continuously carried along, so that satisfactory lubrication is provided. Excess damping medium carried along accumulates in an annular chamber 27''' and is returned via a connection 28''' to the equalization chamber 14'''. The flow connection 4''', which is also present in the guide component 10''', regulates the flow in connection with the damping valve 1'''.

The damping valve 1''' comprises an electromagnet 2''', which is comprised of a coil body 3''' and a winding 6''', as well as an armature 5'''. If the electromagnet 2''' receives current via the connection lines 21''', then the armature 5''' is immersed in the recess 29''' provided, thereby closing the flow connection 4''' between the upper work chamber and the equalization chamber 14'''. In this embodiment, the damping valve 1''' is a component of the guide component 10'''. To achieve a variable flow of the damping fluid, there are several electromagnets 2''' distributed around the circumference of the guide component 10'''. The armatures 5 are thereby oriented transverse to the flow connection 4''', so that the flow of the damping medium can take place in both directions.

Figure 28:
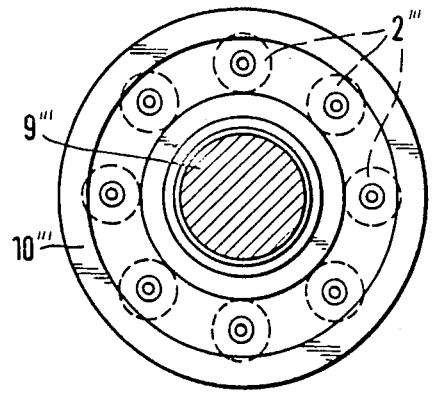
FIG. 28 shows a section through the damping valve illustrated in FIG. 27.

FIG. 28 shows a section through a guide component 10''', in which several electromagnets 2''' are distributed over the circumference. Each electromagnet 2''' has an armature 5''', which can be immersed in a flow connection 4'''. As a result of this arrangement, with a total of eight electromagnets in all, there is a great variability of the regulation of the control of the damping medium located in the damping cylinder 8'''.

Figure 29:
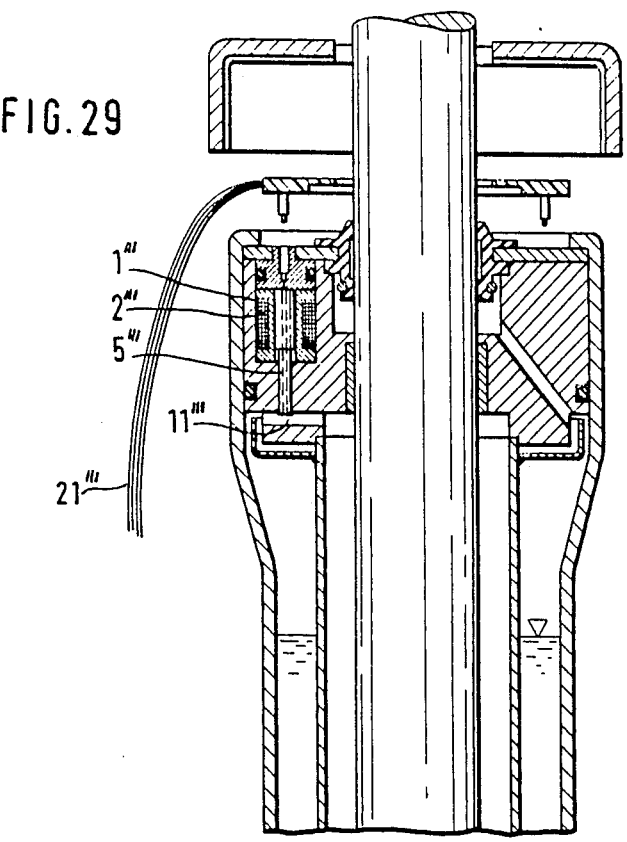
FIG. 29 shows another variant of the damping valve illustrated in FIG. 27, in section.

FIG. 29 shows another variant of a damping valve 1''', in which the flow connection 4''' is designed as a channel 11''' There are several channels 11''' running radially over the entire circumference. Immersed in each channel 11''' is an armature 5''' of an electromagnet 2''', so that, as shown in an overhead view in FIG. 30, a corresponding number of electromagnets 2''' with a desired number of armatures 5''' can completely, or only partially, open or close the flow in the channels 11'''. If armatures 5''' with different diameters and a corresponding electronic system are used, the result is not only a great variability, but also a rapid switching frequency.

One advantage of this embodiment is that there can be any number of individual channels, which can be controlled independently of one another, in the flow connection from the upper work chamber into the equalization chamber. Thereby, each individual connection channel is activated by an electromagnet equipped with an armature. A flow regulation is achieved by the immersion of the armature in the connection channel. As a result of the parallel control, each connection channel can be controlled individually, or all of the flow channels can be controlled together, to influence the flow resistance. It does not matter whether the individual connection channels exhibit the same cross section, or whether each individual connection channel has a different cross section. Depending on the embodiment, the armature is adapted to the cross section of the flow channel.

When several electromagnets are used, even greater variability is achieved if the diameters of the armature are of different sizes or if several armatures are immersed in a single flow connection. In the latter case, the diameters of the armatures can be the same or different.

Figure 30:
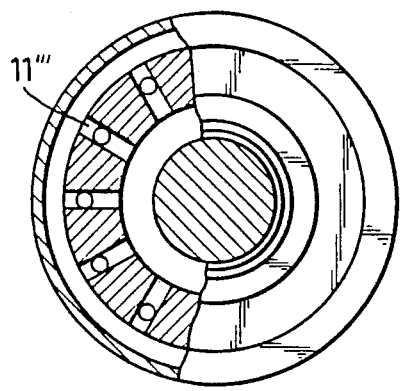
FIG. 30 shows a section through the damping valve illustrated in FIG. 29.

As can be seen in FIG. 30, the flow channels 11''' have varying cross sections and the armatures 5''' are also shown to have varying diameters.

The invention as described hereinabove in the context of the preferred embodiments is not to be taken as limited to all of the provided details thereof, since modifications and variations thereof may be made without departing from the spirit and scope of the invention.

What is claimed is:

1. An adjustable hydraulic vibration damper, comprising:
    a working cylinder containing hydraulic fluid;
    a piston dividing said working cylinder into first and second working chambers;
    an equalization chamber; and
    adjustable valve means for controlling the flow of said hydraulic fluid between said equalization chamber and at least one of said first and second working chambers, said adjustable valve means comprising:
    a plurality of channels interconnecting said one working chamber and said equalization chamber;
    a plurality of translatable armatures, at least one each of said translatable armatures being associated with each of said plurality of channels, each of said aramtures being translatable between a first position wherein said armature projects into said associated flow channel to effect a variance on the flow therethrough and a second position wherein said armature is substantially withdrawn from said associated flow channel;
    a plurality of electromagnets, one each of said electromagnets being associated with each of said translatable armatures for moving said armatures between said first and second positions; and
    control means for selectively actuating selected numbers of said electromagnets to thereby move selected numbers of said armatures between said first and second positions.

2. The vibration damper according to claim 1, wherein said variation damper further comprises a piston rod attached to said piston and a guide member for guiding said piston rod, and wherein said adjustable valve means is located in said guide member.

3. The vibration damper according to claim 2, wherein the direction of translation of said armatures is transverse to the direction of said associated channels and substantially parallel with the axis of said working cylinder.

4. The vibration damper according to claim 2, wherein the direction of translation of said armatures is substantially transverse to the longitudinal axis of said working cylinder.

5. The vibration damper according to claim 2, further comprising an annular passage substantially coaxial with said working cylinder and wherein said plurality of channels comprise a plurality of first passages interconnecting said working cylinder and said annular passage and a plurality of second passages interconnecting said annular passage with said equalization chamber.

6. The vibration damper according to claim 2, wherein at least two of said plurality of armatures have different diameters.

7. The vibration damper according to claim 1, wherein the direction of translation of said armatures is transverse to the direction of said associated channels and substantially parallel with the axis of said working cylinder.

8. The vibration damper according to claim 7, further comprising an annular passage substantially coaxial with said working cylinder and wherein said plurality of channels comprise a plurality of first passages interconnecting said working cylinder and said annular passage and a plurality of second passages interconnecting said annular passage with said equalization chamber.

9. The vibration damper according to claim 8, further comprising a throttle orifice disposed in at least one of said plurality of channels.

10. The vibration damper according to claim 7, further comprising an annular passage substantially coaxial with said working cylinder and wherein said plurality of channels comprise a plurality of first passages interconnecting said working cylinder and said annular passage and a plurality of second passages interconnecting said annular passage with said equalization chamber.

11. The vibration damper according to claim 7, wherein at least two of said plurality of armatures have different diameters.

12. The vibration damper according to claim 1, wherein the direction of translation of said armatures is substantially transverse to the longitudinal axis of said working cylinder.

13. The vibration damper according to claim 12, wherein at least two of said plurality of armatures have different diameters.

14. The vibration damper according to claim 1, further comprising an annular passage substantially coaxial with said working cylinder and wherein said plurality of channels comprise a plurality of first passsages interconnecting said working cylinder and said annular passage and a plurality of second passages interconnecting said annular passage with said equalization chamber.

15. The vibration damper according to claim 14, wherein at least two of said plurality of armatures have different diameters.

16. The vibration damper according to claim 1, wherein at least two of said plurality of armatures have different diameters.

17. The vibration damper according to claim 1, further comprising at least one additional translatable armature associated with at least one of said plurality of channels, said additional armature being translatable between a first position wherein said armature projects into said one flow channel and a second position wherein said armature is substantially withdrawn from said one flow channel.

18. The vibration damper according to claim 1, further comprising a throttle orifice disposed in at least one of said plurality of channels.

19. The vibration damper according to claim 18, wherein said throttle orifice is disposed at the interconnection of said one channel and said working cylinder.

20. An adjustable hydraulic vibration damper, comprising:
a working cylinder containing hydraulic fluid;
a piston dividing said working cylinder into first and second working chambers;
an equalization chamber;
adjustable valve means for controlling the flow of said hydraulic fluid between said equalization chamber and at least one of said first and second working chambers, said adjustable valve means comprising:
a plurality of channels interconnecting said one working chamber and said equalization chamber;
a plurality of translatable armatures, at least one each of said translatable armatures being associated with each of said plurality of channels, each of said armatures being translatable between a first position wherein said armature projects into said associated flow channel to effect a variable on the flow therethrough and a second position wherein said armature is substantially withdrawn from said associated flow channel;
a plurality of electromagnets, one each of said electromagnets being associated with each of said translatable armatures for moving said armatures between said first and second positions;
control means for selectively actuating selected numbers of said electromagnets to thereby move selected numbers of said armatures between said first and second positions; and
an annular passage substantially coaxial with said working cylinder, said plurality of channels comprising a plurality of first passages interconnecting said working cylinder and said annular passages and a plurality of second passages interconnecting said annular-passage with said equalization chamber;
the direction of translation of said armatures being substantially transverse to the direction of said associated channels and substantially parallel with the axis of said working cylinder.

* * * * *